United States Patent
Cieslinski

(10) Patent No.: US 8,497,900 B2
(45) Date of Patent: Jul. 30, 2013

(54) FILM SCANNER

(75) Inventor: Michael Cieslinski, Ottobrunn (DE)

(73) Assignee: Arnold & Richter Cine Technik & Co. Betriebs KG (DE)

( * ) Notice: Subject to any disclaimer, the term of this patent is extended or adjusted under 35 U.S.C. 154(b) by 894 days.

(21) Appl. No.: 12/640,364

(22) Filed: Dec. 17, 2009

(65) Prior Publication Data
US 2010/0149328 A1  Jun. 17, 2010

(30) Foreign Application Priority Data
Dec. 17, 2008 (DE) .......... 10 2008 062 664

(51) Int. Cl.
H04N 3/02 (2006.01)
H04N 9/10 (2006.01)
H04N 5/77 (2006.01)

(52) U.S. Cl.
USPC ............. 348/98; 348/97; 386/225; 386/242; 386/246

(58) Field of Classification Search
USPC ............. 348/97, 98; 386/225, 242, 246
See application file for complete search history.

(56) References Cited

U.S. PATENT DOCUMENTS

| | | | |
|---|---|---|---|
| 4,786,979 A * | 11/1988 | Claus et al. | 386/230 |
| 4,823,204 A * | 4/1989 | Holland | 386/230 |
| 5,241,659 A * | 8/1993 | Parulski et al. | 345/589 |
| 5,270,831 A * | 12/1993 | Parulski et al. | 358/403 |
| 5,410,415 A * | 4/1995 | Parulski et al. | 358/403 |
| 5,414,811 A * | 5/1995 | Parulski et al. | 345/501 |
| 5,448,372 A * | 9/1995 | Axman et al. | 386/201 |
| 5,543,925 A * | 8/1996 | Timmermans | 386/219 |
| 5,574,659 A * | 11/1996 | Delvers et al. | 358/296 |
| 5,862,297 A * | 1/1999 | Timmermans | 386/242 |

(Continued)

FOREIGN PATENT DOCUMENTS

| | | |
|---|---|---|
| DE | 3819496 C2 | 1/1989 |
| DE | 3736789 A1 | 5/1989 |

(Continued)

OTHER PUBLICATIONS

Nischwitz, Alfred, et al.: Computergrafik und Datenverar-beitung. Alles fur Studium und Praxis. vol. 2, Wiesbaden, Vieweg-Verlag 2007, ISBN 978-3-8348-0186-9, table of contents, index.

(Continued)

*Primary Examiner* — Backhean Tiv
(74) *Attorney, Agent, or Firm* — Amster, Rothstein & Ebenstein LLP

(57) ABSTRACT

A film scanner for the optical scanning of a motion picture film having a sequence of a plurality of image regions and at least one row of a plurality of perforation holes in the longitudinal direction, in particular a motion picture film of the type 16 mm or 35 mm, comprises an image sensor for the detection at least of a respective image region of the motion picture film to generate a corresponding scanned image. The film scanner further comprises an evaluation unit for the evaluation of the scanned image to generate an image steadiness correction signal. The image sensor is made for the additional detection of only a respective part region of perforation holes in the environment of the detected image region of the motion picture film, with the evaluation unit being made to determine a position of the detected part region of at least one perforation hole. The evaluation unit generates the image steadiness correction signal on the basis of the at least one determined part region position.

13 Claims, 2 Drawing Sheets

U.S. PATENT DOCUMENTS

| | | | |
|---|---|---|---|
| 5,889,578 A * | 3/1999 | Jamzadeh | 355/41 |
| 6,037,974 A * | 3/2000 | Truc et al. | 348/96 |
| 7,217,943 B2 * | 5/2007 | Eckardt et al. | 250/559.02 |
| 2010/0149328 A1 * | 6/2010 | Cieslinski | 348/98 |

FOREIGN PATENT DOCUMENTS

| | | |
|---|---|---|
| DE | 3736789 C2 | 3/1996 |
| DE | 19531508 A1 | 2/1997 |
| DE | 19731531 A1 | 1/1999 |
| DE | WO2005084014 A1 | 9/2005 |
| DE | 19815066 B4 | 11/2006 |
| DE | 19731530 B4 | 1/2007 |
| DE | 102005042136 A1 | 3/2007 |
| EP | WO02078323 A1 | 10/2002 |
| WO | WO9106181 A1 | 5/1991 |
| WO | WO02078323 A1 | 10/2002 |

OTHER PUBLICATIONS

German Search Report, relating to German Patent Application No. 10 2008 062 664.3, dated Jul. 2, 2009 with English Translation.
European Search Report dated Apr. 7, 2010 and translation thereof.

* cited by examiner

FILM SCANNER

BACKGROUND OF INVENTION

1. Field of Invention

The invention relates to a film scanner and to a method for the optical scanning of a motion picture film.

2. Description of Prior Art

A film scanner of this type serves for the scanning of the image information of an exposed film, for example for the purpose of digital post-processing. A transmission arrangement is usually provided for this purpose, with the film material to be scanned being illuminated on the one side and an optical receiving system and a light receiver being arranged on the other side.

The motion picture film is transmitted intermittingly in such a film scanner to sequentially illuminate the individual exposed image sections, i.e. the individual image sections following one another, and to scan them optically. It is desired in this process to scan a sequence of mutually following individual image sections without any image shift, in particular without any horizontal image shift (weave) and without any vertical image shift (jitter). The image sections should therefore be detected in an unchanging relative position with respect to the film track and with respect to the visual field of the light receiver of the film scanner in order to avoid "jolts" on a later playback of the scanned image sequence.

It is known for this purpose, for example for a motion picture film of the type 35 mm, to fix the position of the motion picture film precisely in a position of rest between two transport movements, with usually locking register pins engaging into the perforation holes which are provided on both longitudinal sides of the film and serve for the transport of the film by means of a sprocket drum. A mechanical registration of this type, however, results in unwanted wear of the perforation holes. Aged footage 5 can have shrunk or be very brittle so that it can be damaged on the introduction of the registration pins into the perforation holes. Cut points and paste points can additionally prevent the mechanical registration with the aid of the locking register pins from working with the desired precision.

A further disadvantage in film scanners having intermittent film transport and mechanical registration is a lower speed in comparison with film scanners having continuous film transport since the film transport, the mechanical registration and the scanning have to take place after one another. This has the result that only approximately 8 to 10 images per second can be scanned so that the duration of the scanning procedure increases approximately threefold with respect to the original running speed of the film.

It is known to detect the actual image position using capacitive or optical methods and to carry out a corresponding post-positioning of the image or a subsequent image steadiness correction. DE 10 2005 042 136 A1 thus discloses a film scanner which has, in addition to the light receiver for the generation of the scanned images, a separate image sensor which only scans the perforation holes. Such an arrangement is, however, undesirably complex from a construction aspect. In addition, on the use of additional sensors, there is the need to adjust them relative to the main image sensor.

SUMMARY OF THE INVENTION

It is the object of the invention to avoid an image shift in a film scanner on the optical scanning of a motion picture film in a cost-effective manner and with high precision.

This object is satisfied by a film scanner having the features of claim 1, and in particular by a film scanner for the optical scanning of a motion picture film which has a sequence of a plurality of image areas and at least one row of a plurality of perforation holes in the longitudinal direction, in particular of a motion picture film of the type 16 mm or 10 35 mm, having an image sensor for the detection at least of a respective image region of the motion picture film to generate a corresponding scanned image and having an evaluation unit for the evaluation of the scanned image to generate an image steadiness correction for the scanned image. The film scanner is characterized in that the image sensor is made for the additional detection of only a respective part region of perforation holes in the environment of the detected image region of the motion picture film, with the evaluation unit being made to determine a position of the detected part region of at least one perforation hole and to generate the image steadiness correction signal on the basis of the at least one determined part region position.

In a film scanner in accordance with the invention, part regions of perforation holes are therefore detected with the same image sensor with which the corresponding scanned image is also generated. This is based on the recognition that it is not necessary for a reliable generation of the image steadiness correction signal to detect the total width of the motion picture film. It is rather the case that the image field of the image sensor only has to be selected so large that a part region, in particular a part region facing the detected image region, of the perforation holes is detected. The image steadiness correction signal can then, for example, be generated from the deviation of the determined position of the part region of the at least one perforation hole from a corresponding reference position. An electronic image steadiness correction can be carried out for every scanned image region with reference to the generated image steadiness correction signal. This can in particular take place within the film scanner or subsequently outside the film scanner.

With a 35 mm film, for example, the image field of the image direction required for the detection of the image region amounts to 25 mm sensor in the horizontal. It would have to be increased to 31 mm if the perforation holes should be completely visible in the image. In accordance with the invention, it is, however, sufficient in a film scanner for the scanning of the 35 mm film named by way of example to increase the image to 28 mm field in the horizontal direction so that a correspondingly smaller and thus 15 more cost-effective image sensor can be used.

A further advantage is that the optical system can also be designed for a smaller image field, which likewise results in a cost advantage. In addition, less unwanted scattered light is produced and the illumination of the film is simplified. Finally, in the film scanner in accordance with the invention, a larger contact surface for the film is available in the film carrier, whereby the planarity of the film and thus the picture sharpness of the scanned images increases.

The use of the film scanner in accordance with the invention is not limited to 35 mm film, but can rather also be used for other film formats, for example for 16 mm films. Furthermore, it is possible to scan both films in which perforation holes are provided on both sides of the image region and films which are only provided with perforation holes on one side of the image region, such as super 16 films.

In accordance with a preferred embodiment of the invention, the detected part region of the perforation holes is bounded by the image field of the image sensor.

Furthermore, the detected part region of the perforation holes can be bounded by a mask, in particular by a film carrier of the film scanner. The mask can also be a component of the film carrier.

The evaluation unit is preferably made to determine a positional deviation from a desired value of the position of the respective part region of the perforation hole on the basis of the at least one determined part region position, with the image steadiness correction signal corresponding to the determined positional deviation or to a combination of a plurality of the positional deviations determined for an image region. For a perforation hole, a deviation of the previously determined position of a part region of this perforation hole from a preset desired value is therefore determined in each case. In the case of the detection of the part regions of a plurality of perforation holes for an image region, the combination can take place, for example, by formation of a mean value over the positional deviations. It is also possible to leave at least one extreme value of the determined part region positions, for example the largest and the smaller individual result, out of consideration in the generation of the image steadiness correction signal in order to achieve a higher precision in the generation of the image steadiness correction signal.

The evaluation unit is preferably made to determine the position of the detected part region of the respective perforation hole on the basis of the position of the center of area of the detected part region. In this manner, 30 both weave and jitter can be determined. The position of the center of area is determined, for example, by formation of the surface integral. The determination of the position of the detected part region of the respective perforation hole then takes place analytically by a corresponding formula or by means of a look-up table. A linear relationship or a non-linear relationship between the respective part region position and the center of area can be present in dependence on the shape of the perforation holes.

In a preferred embodiment of the invention, the evaluation unit is made for the determination of the area of the detected part region of the at least one perforation hole, with the evaluation unit being made for the determination of the position of the detected part region of the at least one perforation hole on the basis of the area of the detected part region. The fact is utilized in this respect that the relationship between the area of the detected part region and an image shift only depends on the shape of the perforation hole. A formula can therefore be set forth for a preset shape of the perforation holes, for example, by means of which the position of the detected part region can be calculated on the basis of the area of this part region. The shape of the perforation holes of a motion picture film to be scanned can either be recognized automatically or selected manually for this purpose at the start of the scanning process, in particular on the basis of a stored look-up table.

Alternatively to the use of the aforesaid formula, a look-up table can be stored in the evaluation unit, with a value of the position of the detected part region being associated with a respective value of the area for a plurality of values of the area of the detected part region in said look-up table. The value of the position can be determined by interpolation for intermediate values.

In accordance with a further advantageous embodiment, the evaluation unit is made for the determination of the area and of the periphery of the detected part region of the at least one perforation hole, with a look-up table being stored in the evaluation unit, with a desired value of the periphery of the detected part region being associated with a respective value of the area in said look-up table, with the evaluation unit being made for the determination of a deviation of the determined periphery from the associated desired value, and with the evaluation unit being made to leave a determined position of the detected part region of the respective perforation hole out of consideration with respect to the generation of the image steadiness correction signal if the determined deviation of the periphery exceeds a limit value for this determined part region position. In this respect, the determination of the position of the detected part region likewise takes place on the basis of the area of this part region. An associated desired value of the periphery is determined in the look-up table for this value of the area and is compared with the actual periphery of the detected part region. If this deviation between the actual value and the desired value exceeds a limit value, the position of this part region is not taken into account in the generation of the image steadiness correction signal. Unsuitable holes can thus be rejected. A deviation between the determined value and the desired value of the periphery can result, for example, by damage to the rim of the perforation hole or by a foreign body, e.g. a dust particle or fluff, disposed in the detected part region. The risk of the generation of a defective image steadiness correction signal can be avoided by the leaving out of consideration.

It is possible to associate a global limitation value valid for the total look-up table or individual limit values with the desired value of the periphery by means of the named look-up table or by means of an additional look-up table.

In accordance with a preferred embodiment, the evaluation unit is made for the detection of the respective area and of the respective periphery of the detected part region of a plurality of perforation holes, with a look-up table being stored in the evaluation unit, with a desired value of the periphery of the detected part region being associated with a respective value of the area in said look-up table, with the evaluation unit being made for the determination of a deviation of the determined periphery from the associated desired value, and with the evaluation unit being made to leave the determined position of the respective perforation hole out of consideration with respect to the generation of the image steadiness correction signal for at least one detected part region with the largest determined deviation of the periphery. It is hereby possible, for example, also to reject those part regions or part region positions in which a determination of whether a determined deviation of the periphery exceeds a limit value was not carried out or an exceeding of a limit value was not found, in order to improve the precision in the generation of the image steadiness correction signal.

In accordance with another advantageous embodiment of the invention, the evaluation unit is made for the determination of the area and of the center of area of the detected part region of the at least one perforation hole, with a look-up table being stored in the evaluation unit, with a desired position of the center of area of the detected part region being associated with a respective value of the area in said look-up table, with the evaluation unit being made for the determination of a deviation of the determined center of area from the associated desired position, and with the evaluation unit being made to leave a determined position of the detected part region of the respective perforation hole out of consideration with respect to the generation of the image steadiness correction signal if the determined deviation of the center of area exceeds a limit value for this determined part region position. It is hereby likewise possible to determine the damage to perforation holes or the presence of a foreign body in the detected part region of the perforation hole in a simple manner and to leave this part region out of consideration in the generation of the image steadiness correction signal.

Alternatively or additionally, the evaluation unit can be made for the determination of the respective area and of the respective center of area of the detected part region of a plurality of perforation holes, with a look-up table being stored in the evaluation unit, with a desired position of the center of area of the detected part region being associated with a respective value of the area in said look-up table, with the evaluation unit being made for the determination of a deviation of the determined center of area from the associated desired position, and with the evaluation unit being made to leave the position of the respective perforation hole out of consideration with respect to the generation of the image steadiness correction signal for at least one detected part region with the largest determined deviation of the center of area. To improve the precision, those part regions or part region positions can also hereby be rejected in which the determination of an exceeding of the limit value of the deviation of the position of the center of area from a desired position was not carried out or in which an exceeding was not found.

In accordance with another advantageous embodiment of the invention, the evaluation unit is made for the recognition of the part regions of the perforation holes on the basis of a brightness distribution of the scanned image. This is based on the fact that the perforation holes are as a rule the regions with the largest brightness in the image. The transitions air-to-film and film-to-air can also effect a reflection of approximately 4% of the light in each case in completely transparent image regions. The detected part regions of the perforation holes can therefore be clearly identified with reference to the brightness distribution, i.e. the histogram, of the scanned image. The areal proportion of the detected part regions of the perforation holes in the total image is thus almost constant on the detection of both sides of the perforation rows so that a quantile is determined with reference to the areal proportion whose brightness values can be associated with the detected part regions of the perforation holes.

The evaluation unit is preferably also made for the recognition of the part regions of the perforation holes on the basis of a threshold value of the brightness of the scanned image. A respective part region of a perforation hole can thus be identified by a simple threshold value comparison with reference to the brightness.

The threshold value can be determined, for example, from the brightness distribution with reference to the mean or the smallest brightness value of the quantile associated with the areal proportion of the detected part regions. With constant lighting conditions, a recognition of the part regions of the perforation holes can also take place on the basis of a fixed brightness threshold value since the perforation holes usually have a constant brightness.

The threshold can furthermore also be defined by the minimum in the brightness distribution which is located between the highest brightness values associated with the perforation holes and the brightness values associated with the completely transparent points in the image region of 30 the motion picture film.

The invention is further achieved by a method for the optical scanning of a motion picture film which has a sequence of a plurality of image regions and at least one row of a plurality of perforation holes in the longitudinal direction, in particular a motion picture film of the type 16 mm or 35 mm, comprising the steps: detecting at least a respective image region of the motion picture film; generating a corresponding scanned image; and generating image steadiness correction values for the scanned image. The method is characterized in that the detection of the respective image region includes the additional detection of only a respective part region of perforation holes in the environment of the detected image region of the motion picture film. A position of the detected part region of at least one of the perforation holes is determined. The image steadiness correction signal is generated on the basis of the at least one determined part region position. Further preferred embodiments of the invention are set forth in the dependent claims.

BRIEF DESCRIPTION OF THE DRAWINGS

The invention will be described in the following with reference to an embodiment and to the drawing. In which are shown.

DESCRIPTION OF THE PREFERRED EMBODIMENTS

Figure 1:
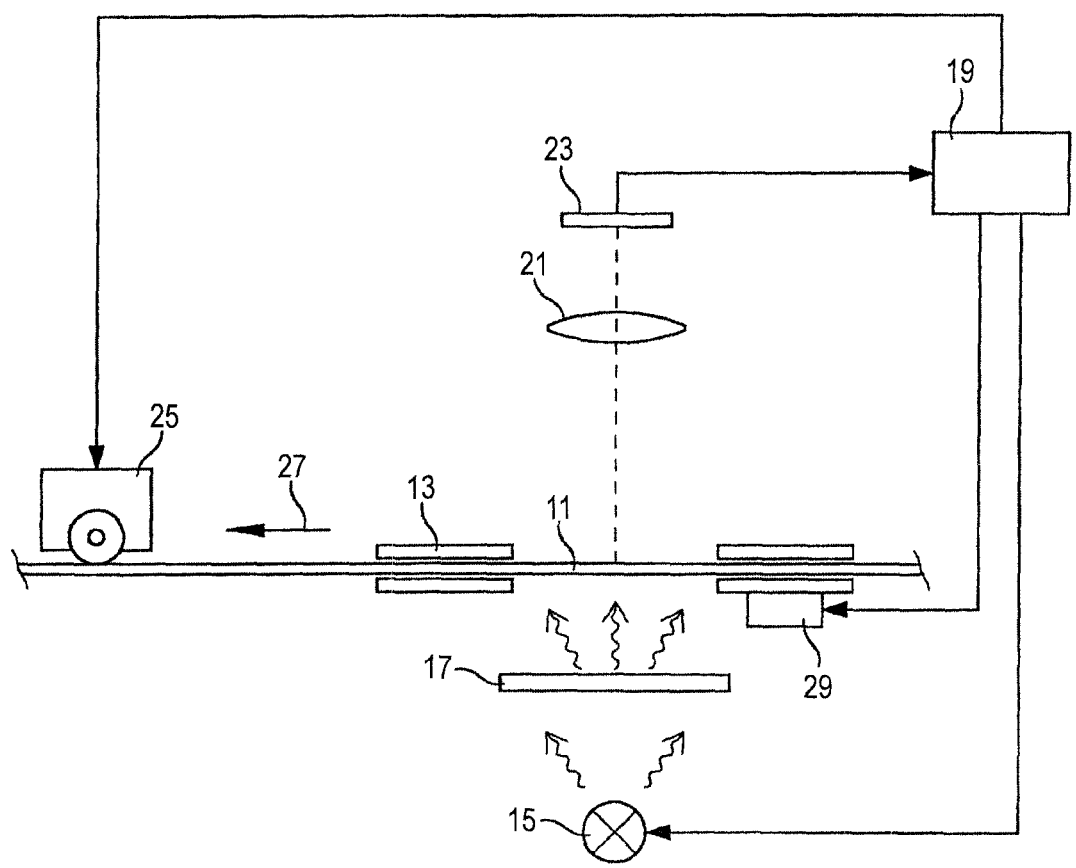
FIG. 1 a schematic representation of an embodiment of a film scanner.

FIG. 1 illustrates the design of a film scanner for the optical scanning of an 30 exposed motion picture film 11, which is guided in a film track 13. The motion picture film 11 or a respective exposed image region thereof is illuminated by means of a light source 15 and a downstream diffuser 17. An optical receiving system 21, which is shown by way of example as a converging lens, is arranged on the side of the motion picture film 11 disposed opposite the light source 15. The optical receiving system 21 images the image region of the motion picture film 11 to be scanned onto an optoelectronic image sensor 23 which is made, for example, as a CCD or CMOS sensor having a matrix-type arrangement of photoelectric reception elements. The reception elements generate a respective picture element measured value in dependence on the light exposure, with the image sensor 23 being connected to an input of a control and evaluation unit 19.

The optical scanning of the motion picture film 11 takes place in that it is 15 moved along a transport direction 27 image region by image region by means of a drive device 25. The image region released by the film track 13 is illuminated by a corresponding control of the light source 15 in every rest position of the motion picture film 11. In this process, a scanned image having a matrix of picture element measured values is generated by means of the image sensor 23 and is read out by means of the control and evaluation circuit 19. Alternatively, a scanning of the respective image region taking place line-by-line is generally also possible.

Figure 2:
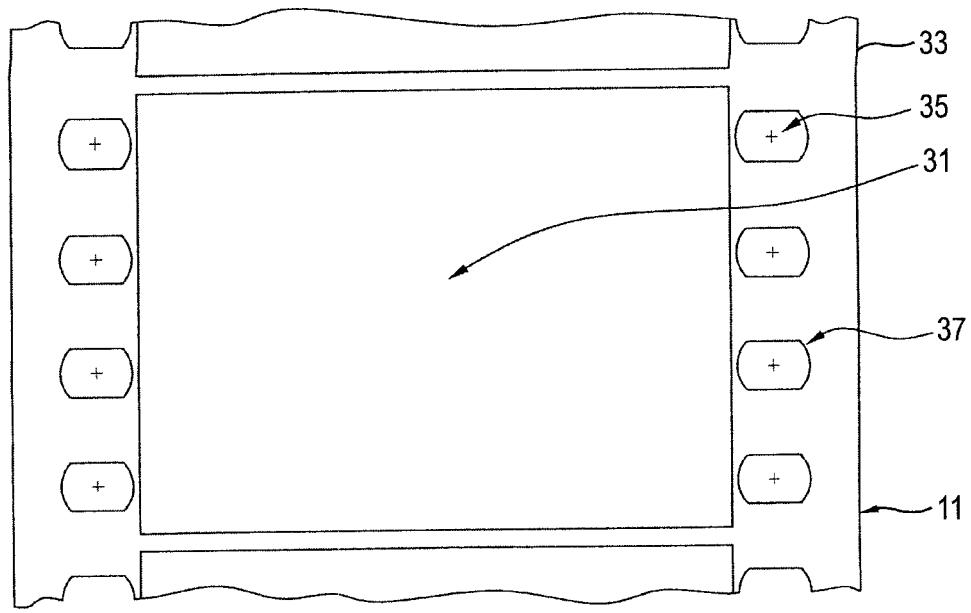
FIGS. 2 and 3 a section of a motion picture film.

FIG. 2 shows a section of the motion picture film 11 with an image region 31. A sequence of a plurality of such image regions 31 is provided in the longitudinal direction of the motion picture film 11 (i.e. in the running direction or in the vertical direction with respect to the representation in accordance with FIG. 2). A series of round-rectangular perforation holes 35 which are each bounded by a hole rim 37 is located between the respective image region 31 and each longitudinal rim 33 of the motion picture film 11.

Figure 3:
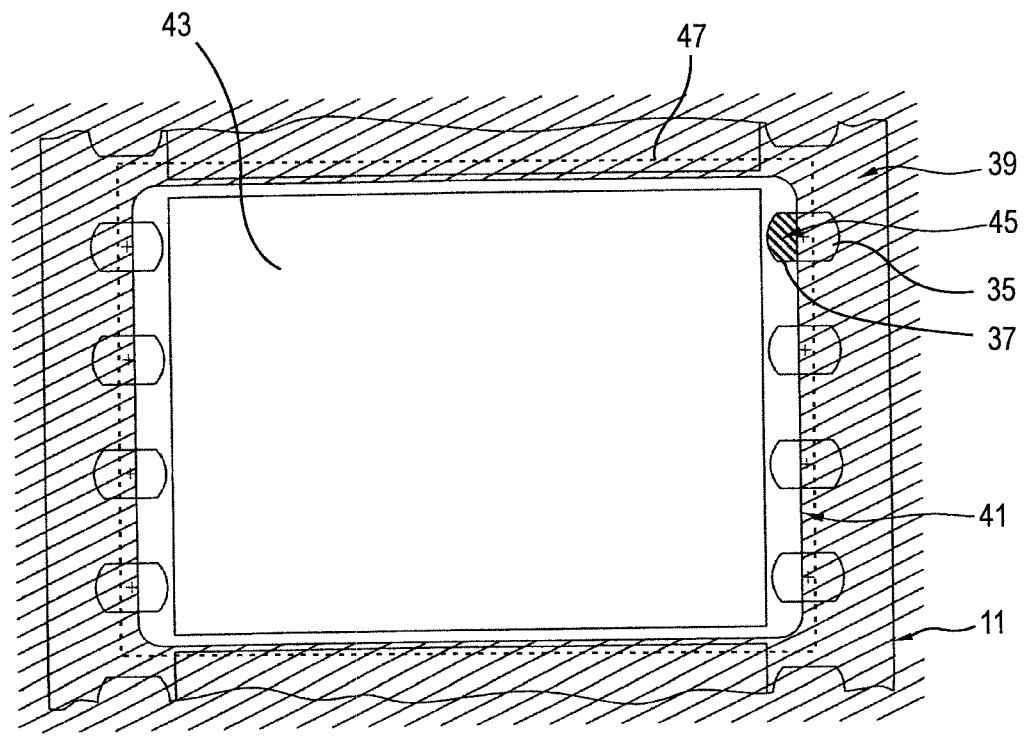

FIG. 3 shows the section of the motion picture film 11 in accordance with FIG. 2 in a film carrier 39 which is shown as a hatched area and whose opening 43 is bounded by the film carrier rim 41. The sensor image field 47 shown in dashed lines, i.e. the maximum region which could be detected by the image sensor 23 without masks or diaphragms in the beam path, is somewhat larger than the opening 43 of the film carrier 39 in this example so that the film carrier rim 41 is visible in a scanned image taken by the image sensor 23. Alternatively to this, the image field 47 of the image sensor 23 can, however, also coincide with the shown film carrier rim 41 or lie within the film carrier rim 41.

On the scanning of the motion picture film 11, the respective image region 31 as well as a total of eight part regions 45 of the perforation holes 35 laterally adjacent to the respective image region 31 are detected, with the part regions 45 being bounded, on the one hand, by the respective hole rim 37 and, on the other hand, by the film carrier rim 41 (alternatively by the image field 47 of the image sensor 23). One of the named eight part regions 45 is shown hatched in FIG. 3.

Generally, motion picture films not shown here can also be scanned in which perforation holes are only provided on one side of the image region. The number of detected part regions is reduced to four in this case with an unchanged hole spacing.

The scanned image generated by the image sensor 23 is supplied to the control and evaluation circuit 19 to generate an image steadiness correction signal.

It becomes clear from FIG. 3 that the image shift of a respective image region 31 can be determined in the vertical direction, i.e. in the running direction of the motion picture film 11, directly from the vertical position of the centers of area of the part regions 45. The image correction signal results, for example, directly from the deviations of the centers of area of the detected part regions 45 of the perforation holes 35 from respective preset reference positions. In this respect, a mean value formation over the named deviations of the centers of area can be provided for each image region 31.

In the horizontal direction in accordance with FIG. 3, i.e. transversely to the running direction of the motion picture film 11, the image shift can be determined in accordance with the respective horizontal position of the centers of area, with a mean value formation preferably also being provided here. There is namely a preset relationship between the image shift in the horizontal direction and the shift of the center of area of the part region 45 in the horizontal direction.

The evaluation is particularly simple when the image shift is determined on the basis of the area of the detected part region 45. The relationship between the area of the part region 45 and the image shift, i.e. the positional deviation from a desired value of the position of the respective part region of the perforation hole, depends only on the shape of the perforation hole 35. A relationship can therefore be set forth in formula terms. Alternatively, a look-up table can be prepared in which a value of the position of the detected part region 45 is associated with a respective value of the area for a plurality of values of the area of the part region 45.

In addition, a desired position of the respective center of area and/or a desired value of the periphery of the detected part region 45 can also be stored in this look-up table. On the evaluation of the scanned image, a check can then be made whether the position of the center of area determined from the scanned image or the periphery of the detected part region 45 coincides within preset tolerances with the desired position of the center of area or with the desired value of the periphery which are entered in the look-up table for the corresponding area. Damaged and/or torn perforation rims 37 or the detection of a dust particle or of fluff in the detected part region 45 can thereby be recognized. The respective part regions 45 are not taken into consideration in this case with respect to the generation of the image steadiness correction signal for the associated image region, whereby an even higher precision of the image steadiness correction is achieved.

Further possibilities for the evaluation of the scanned image have already been explained in detail initially. Different criteria can in particular be used to exclude individual ones of the detected part region 45 from the generation of the image steadiness correction signal in the vertical and/or horizontal direction(s).

An electronic image steadiness correction with high precision is made possible overall. Since an only slightly enlarged image field 47 of the image sensor 23 is required for this, a cost-effective design of the film scanner results. An unwanted additional entry of scattered light is moreover avoided which could arise if the image sensor 23 and the optical receiving system 21 were designed for the detection of the whole perforation holes 35.

REFERENCE NUMERAL LIST 11 motion picture film
13 film track
15 light source
17 diffuser
19 control and evaluation circuit
21 optical receiving system
23 image sensor
25 drive device
27 transport direction
31 image region
33 longitudinal rim
35 perforation hole
37 hole rim
39 film carrier
41 film carrier rim
43 opening
45 part region
47 sensor image field

The invention claimed is:

1. A film scanner for the optical scanning of a motion picture film which has a sequence of a plurality of image regions and at least one row of a plurality of perforation holes in the longitudinal direction, in particular a motion picture film of the type 16 mm or 35 mm, having an image sensor for the detection at least of a respective image region of the motion picture film to generate a corresponding scanned image; and having an evaluation unit for the evaluation of the scanned image to generate an image steadiness correction signal for the scanned image, characterized in that the image sensor is made for the additional detection of only a respective part region of perforation holes in the environment of the detected image region of the motion picture film, with the evaluation unit being made to determine a position of the detected part region of at least one perforation hole and to generate the image steadiness correction signal on the basis of the at least one determined part region position, and the evaluation unit is made for the determination of the area and of the periphery of the detected part region of the at least one perforation hole, with a lookup table being stored in the evaluation unit, with a desired value of the periphery of the detected part region being associated with a respective value of the area in said look-up table, with the evaluation unit being made for the determination of a deviation of the determined periphery from the associated desired value, and with the evaluation unit being made to leave a determined position of the detected part region of the respective perforation hole out of consideration with respect to the generation of the image steadiness correction signal if the determined deviation of the periphery exceeds a limit value for this determined part region position.

2. A film scanner in accordance with claim 1, characterized in that the detected part region of the perforation holes is bounded by the image field of the image sensor.

3. A film scanner in accordance with claim 1, characterized in that the detected part region of the perforation holes is bounded by a mask, in particular by a film carrier of the film scanner.

4. A film scanner in accordance with claim 1, characterized in that the evaluation unit is made to determine the respective position of the detected part region of a plurality of perforation holes and to leave at least one extreme value of the determined plurality of positions out of consideration with respect to the generation of the image steadiness correction signal.

5. A film scanner in accordance with claim 1, characterized in that the evaluation unit is made to determine a positional deviation from a desired value of the position of the respective part region of a perforation hole on the basis of the at least one determined part region position, with the image steadiness correction signal corresponding to the determined positional deviation or to a combination of a plurality of the positional deviations determined for an image region.

6. A film scanner in accordance with claim 1, characterized in that the evaluation unit is made to determine the position of the detected part region of the respective perforation hole on the basis of the position of the center of area of the detected part region.

7. A film scanner in accordance with claim 1, characterized in that the evaluation unit is made for the determination of the area of the detected part region of the at least one perforation hole, with the evaluation unit being made for the determination of the position of the detected part region of the at least one perforation hole on the basis of the area of the detected part region.

8. A film scanner in accordance with claim 7, characterized in that a look-up table is stored in the evaluation unit, with a value of the position of the detected part region being associated with a respective value of the area for a plurality of values of the area of the detected part region in said look-up table.

9. A film scanner in accordance with claim 1, characterized in that the evaluation unit is made for the recognition of the part regions of the perforation holes on the basis of a brightness distribution of the scanned image.

10. A film scanner in accordance with claim 1, characterized in that the evaluation unit is made for the recognition of the part regions of the perforation holes on the basis of a threshold value of the brightness of the scanned image.

11. A film scanner for the optical scanning of a motion picture film which has a sequence of a plurality of image regions and at least one row of a plurality of perforation holes in the longitudinal direction, in particular a motion picture film of the type 16 mm or 35 mm,
    having an image sensor for the detection at least of a respective image region of the motion picture film to generate a corresponding scanned image; and having an evaluation unit for the evaluation of the scanned image to generate an image steadiness correction signal for the scanned image,
    characterized in that
    the image sensor is made for the additional detection of only a respective part region of perforation holes in the environment of the detected image region of the motion picture film, with the evaluation unit being made to determine a position of the detected part region of at least one perforation hole and to generate the image steadiness correction signal on the basis of the at least one determined part region position, and
    the evaluation unit is made for the determination of the respective area and of the respective periphery of the determined part region of a plurality of perforation holes, with a look-up table being stored in the evaluation unit, with a desired value of the periphery of the detected part region being associated with a respective value of the area in said look-up table, with the evaluation unit being made for the determination of a deviation of the determined periphery from the associated desired value, and with the evaluation unit being made to leave the determined position of the respective partial region of the perforation hole out of consideration with respect to the generation of the image steadiness correction signal for at least one detected part region- with the largest determined deviation of the periphery.

12. A film scanner for the optical scanning of a motion picture film which has a sequence of a plurality of image regions and at least one row of a plurality of perforation holes in the longitudinal direction, in particular a motion picture film of the type 16 mm or 35 mm,
    having an image sensor for the detection at least of a respective image region of the motion picture film to generate a corresponding scanned image; and having an evaluation unit for the evaluation of the scanned image to generate an image steadiness correction signal for the scanned image,
    characterized in that
    the image sensor is made for the additional detection of only a respective part region of perforation holes in the environment of the detected image region of the motion picture film, with the evaluation unit being made to determine a position of the detected part region of at least one perforation hole and to generate the image steadiness correction signal on the basis of the at least one determined part region position, and
    the evaluation unit is made for the determination of the area and of the center of area of the detected part region of the at least one perforation hole, with a look-up table being stored in the evaluation unit, with a desired position of the center of area of the detected part region being associated with a respective value of the area in the look-up table, with the evaluation unit being made for the determination of a deviation of the determined center of area from the associated desired position, and with the evaluation unit being made to leave a determined position of the detected part region out of consideration with respect to the generation of the image steadiness correction signal if the determined deviation of the center of area exceeds a limit value for this determined part region position.

13. A film scanner for the optical scanning of a motion picture film which has a sequence of a plurality of image regions and at least one row of a plurality of perforation holes in the longitudinal direction, in particular a motion picture film of the type 16 mm or 35 mm,
    having an image sensor for the detection at least of a respective image region of the motion picture film to generate a corresponding scanned image; and having an evaluation unit for the evaluation of the scanned image to generate an image steadiness correction signal for the scanned image,
    characterized in that
    the image sensor is made for the additional detection of only a respective part region of perforation holes in the environment of the detected image region of the motion picture film, with the evaluation unit being made to determine a position of the detected part region of at least one perforation hole and to generate the image steadiness correction signal on the basis of the at least one determined part region position, and the evaluation unit is made for the determination of the respective area and of the respective center of area of the detected part region of a plurality of perforation holes, with a look-up table being stored in the evaluation unit with a desired position of the center of area of the detected part region being associated with a respective value of the area in said look-up table, with the evaluation unit being made for the determination of a deviation of the determined center of area from the associated desired position, and with the evaluation unit being made to leave the determined position of the respective part region of the perforation hole out of consideration with respect to the generation of the image steadiness correction signal for at least one detected part region having the largest determined deviation of the center of area.

* * * * *

UNITED STATES PATENT AND TRADEMARK OFFICE
CERTIFICATE OF CORRECTION

PATENT NO. : 8,497,900 B2
APPLICATION NO. : 12/640364
DATED : July 30, 2013
INVENTOR(S) : Cieslinski It is certified that error appears in the above-identified patent and that said Letters Patent is hereby corrected as shown below:

On the title page item [73], insert

--Arnold & Richter Cine Technik GmbH & Co. Betriebs KG--

Signed and Sealed this
Twelfth Day of July, 2016

Michelle K. Lee
*Director of the United States Patent and Trademark Office*